United States Patent [19]

Barton et al.

[11] 4,392,765

[45] Jul. 12, 1983

[54] ANGLE STACKING AND INVERTING DEVICE

[75] Inventors: Dale S. Barton, Leetonia; Richard M. Heck, Columbiana, both of Ohio

[73] Assignee: Riise Engineering Company, Inc., North Lima, Ohio

[21] Appl. No.: 250,082

[22] Filed: Apr. 1, 1981

[51] Int. Cl.³ .................... B65G 57/081; B65G 57/18
[52] U.S. Cl. ...................................... 414/30; 198/374; 414/56; 414/74
[58] Field of Search .................. 414/30, 55, 56, 74, 414/758, 761, 763, 63; 198/374, 457, 592, 809

[56] References Cited

U.S. PATENT DOCUMENTS

| | | | |
|---|---|---|---|
| 2,559,460 | 7/1951 | Peterson | 414/30 X |
| 3,080,957 | 3/1963 | Wiggins et al. | 198/379 |
| 3,727,758 | 4/1973 | Cleland | 414/55 X |
| 3,735,880 | 5/1973 | Hill et al. | 414/30 X |
| 3,856,157 | 12/1974 | Hill | 414/30 |

FOREIGN PATENT DOCUMENTS

| | | | |
|---|---|---|---|
| 1235811 | 3/1967 | Fed. Rep. of Germany | 414/30 |
| 2219541 | 10/1973 | Fed. Rep. of Germany | 414/30 |
| 1090681 | 11/1967 | United Kingdom | 198/374 |

Primary Examiner—Leslie J. Paperner
Attorney, Agent, or Firm—Harpman & Harpman

[57] ABSTRACT

A device for sorting and alternately inverting and stacking lengths of ferromagnetic material such as rolled steel angle sections includes horizontal conveyors moving the angle sections automatically from a final mill roller table to a selected position. The horizontal conveyors pick up and separate the angle sections while moving them sidewardly at different speeds to predetermined locations and a plurality of multiple section swingable arms carrying magnetic heads selectively engage the angle sections and position them in the selected position.

4 Claims, 8 Drawing Figures

ANGLE STACKING AND INVERTING DEVICE

BACKGROUND OF THE INVENTION

(1) Technical Field

This invention relates to material handling devices and more particularly devices which will handle elongated sections of steel such as angles and position them in alternate upright and inverted stacked relation in a selected position.

(2) Description of the Prior Art

U.S. Pat. No. 3,727,758 discloses a materials handling device which is capable of handling and sorting steel shapes such as elongated angles and the like and utilizes magnetic means on pivoted body members or alternately flexible belts to pick up, move and rearrange the metal shapes.

U.S. Pat. No. 3,080,957 discloses a mechanism for inverting coated articles such as containers to desirably position and hold the same while they are coated or sprayed with a paint or other protective material on the inside and subjected to a drying action. The present invention utilizes a mechanism arrangement substantially different from that disclosed in either of the prior art patents in that the metal angles are picked up from the final mill roller table, moved sidewardly therefrom and separated by different speeds of several horizontal conveyors and moved thereby to predetermined positions where they are either picked up in their as-delivered position and located in a selected position or picked up and inverted and stacked in the selected position.

SUMMARY OF THE INVENTION

An angle stacking and inverting device comprises a plurality of horizontally disposed conveyors operating at different speeds for picking up and moving elongated steel shapes such as angles from a source, spacing the angles with respect to one another in groups at predetermined locations along the conveyors and utilizing multiple sectioned arms with magnetic heads to pick up the groups of angles and move them in their as-received position to a selected position and alternately pick up and invert groups of angles and move them to the selected position and stack the same on the previously moved angles.

DESCRIPTION OF THE PREFERRED EMBODIMENT

Figure 1:
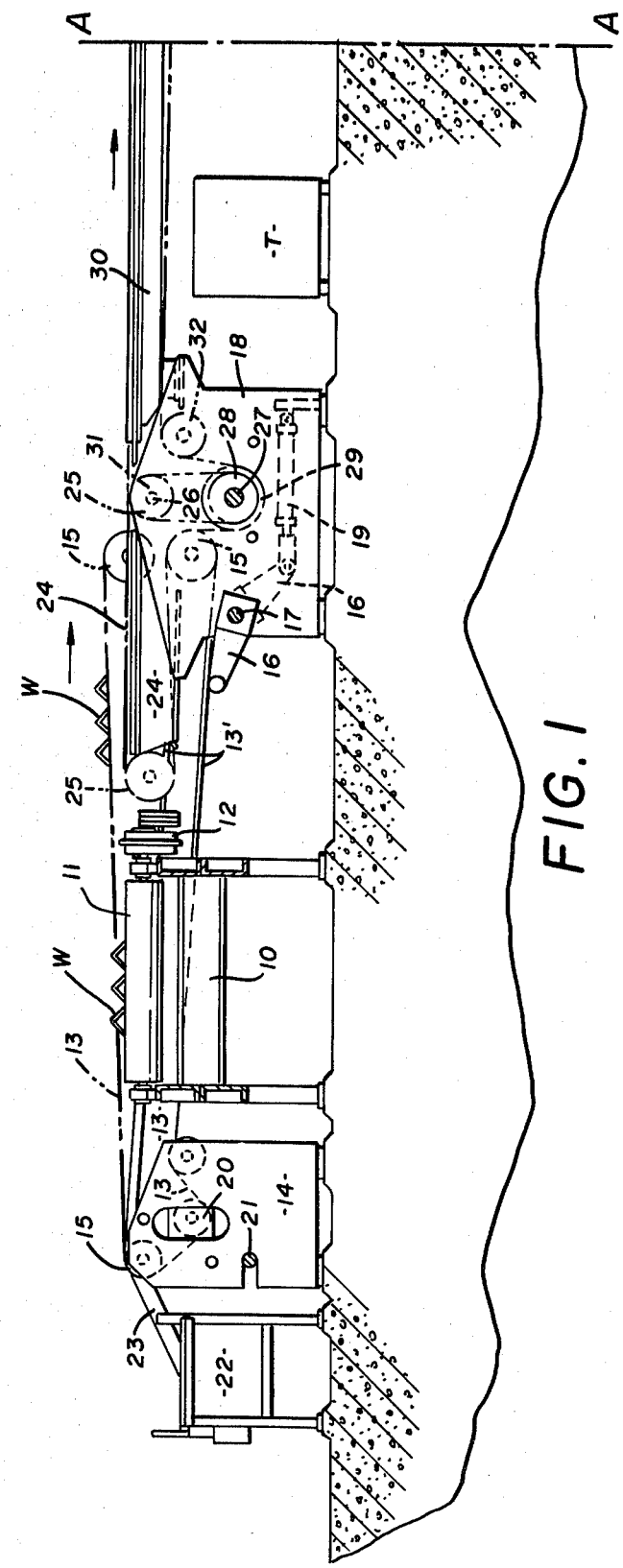
FIG. 1 is a partial side elevation partly in section of a portion of the angle stacking and inverting device.
Figure 1A:
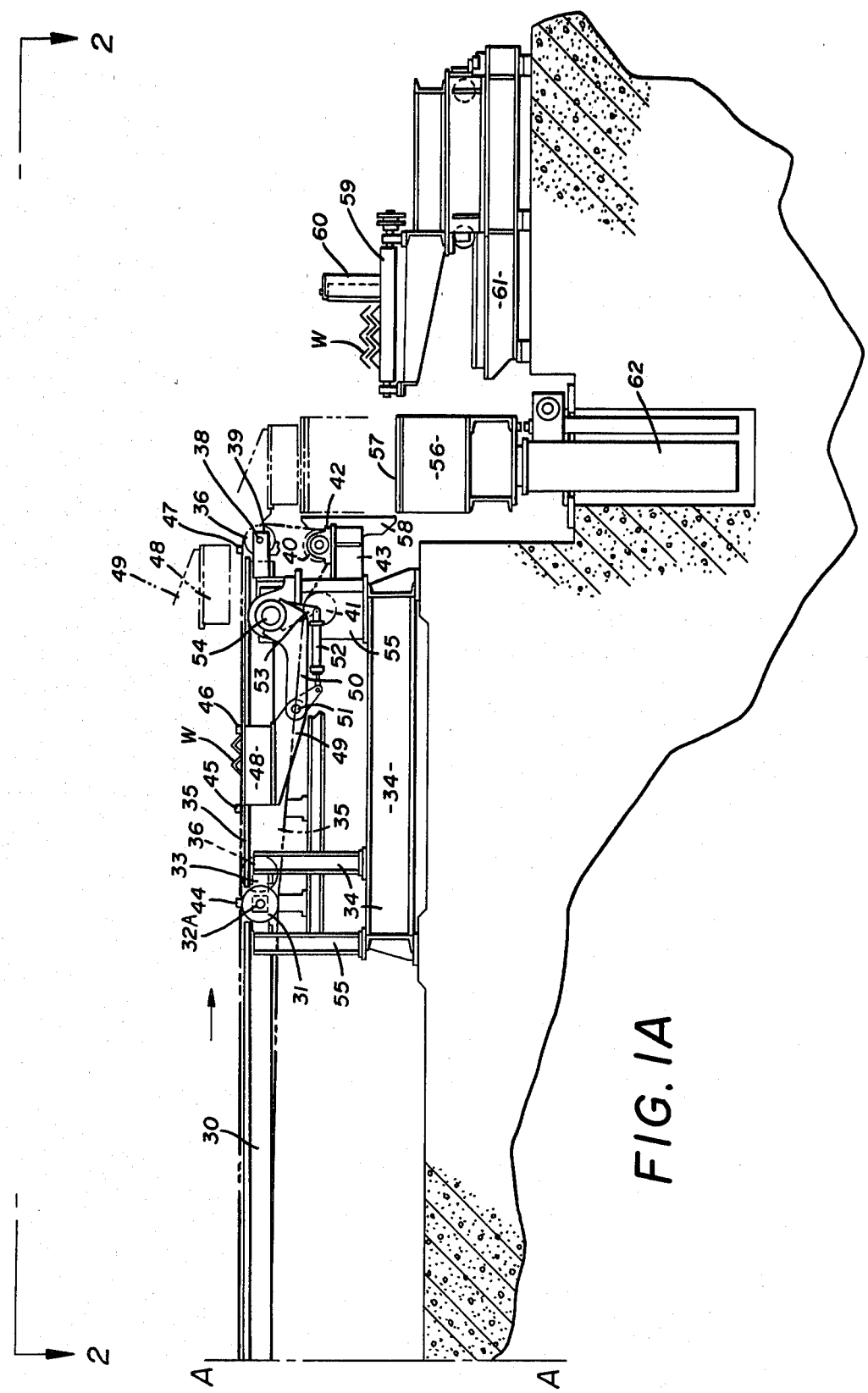
FIG. 1A is a related partial side elevation partly in section of the portion of the angle stacking and inverting device of FIG. 1, FIGS. 1 and 1A being matched at the vertical line A—A on each of the Figures.

By referring to FIGS. 1 and 1A of the drawings, it will be seen that the left end portion of the device of FIG. 1, incorporates a shear run out conveyor 10 comprising a plurality of rolls, one of which is indicated by the numeral 11. Several work pieces comprising angles are shown on the run out conveyor rolls 11 in end elevation and are indicated by the letter W. The rolls 11 of the conveyor 10 are driven by a conventional drive means 12 as will be understood by those skilled in the art.

Figure 2:
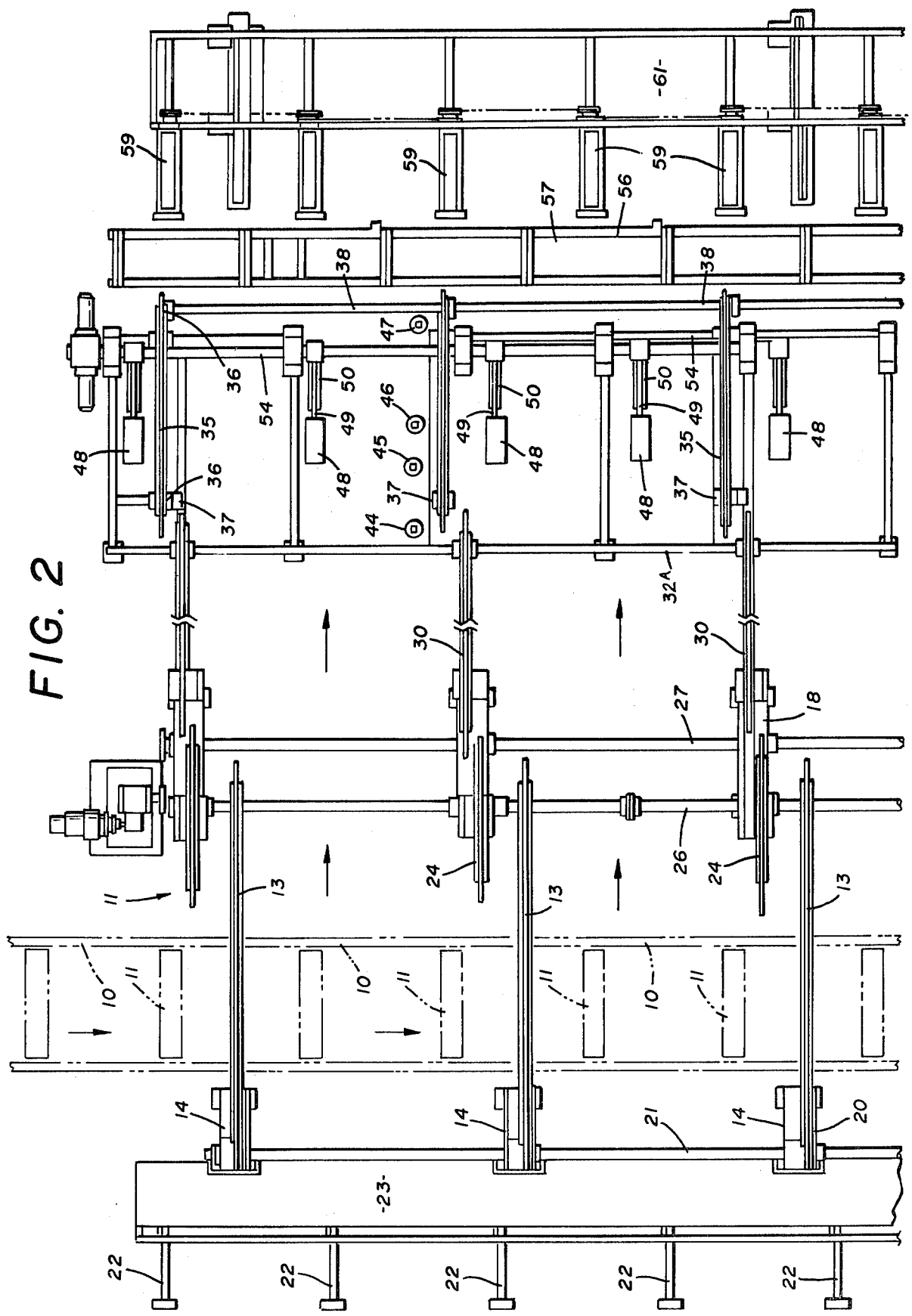
FIG. 2 is a top plan view of the device seen in FIGS. 1 and 1A.

By referring to FIG. 2 of the drawings, it will be seen that the plurality of spaced rolls 11 of the shear run out conveyor 10 are arranged in spaced relation to a plurality of link chain conveyors 13, which are positioned transversely of the shear run out conveyor 10 and as best seen in FIG. 1 of the drawings, arranged so that they may be moved vertically in order to pick up the work pieces W from the shear run out conveyor 10.

In FIGS. 1 and 2 of the drawings, a plurality of stands 14 are illustrated, each of which pivotally supports one end of each of the link chain conveyors 13 which are comprised of elongated frames carrying sprockets 15 in their ends over which the link chains of the conveyors are trained. The right end of each of the link chain conveyors 13 is arranged to be moved up and down by cranks 16 pivoted on shafts 17 in a plurality of secondary stands 18, pneumatic piston and cylinder assemblies 19 being provided for imparting movement to the cranks 16. The arrangement is such that a collection of the work pieces W on the shear run out conveyor 10 may be picked up by moving the link chain conveyors 13 from their position below the upper surfaces of the rolls 11 of the shear run out conveyor 10 as shown in solid lines in FIG. 1 of the drawings to a position thereabove as shown in broken lines in FIG. 1 whereupon the work pieces W will move to the right as the link chain conveyors 13 are moving at a relatively rapid rate. The several link chain conveyors 13 are driven at their left ends as shown in FIG. 1 of the drawings by drive means 20 incorporated in one or more of the stands 14 and interconnected by a common drive shaft 21 as best seen in FIG. 2 of the drawings.

By referring again to FIG. 1 of the drawings, it will observed that to the left of the stands 14, there are a plurality of manual stacking stands 22 interconnected to the stands 14 by a plurality of slides 23. When it is desired that the work pieces W be manually stacked, the link chain conveyors 13 are reversed so as to pick up the work pieces W from the shear run out conveyor 10 and move them to the left where they will move downwardly and outwardly on the slides 23 to the manual stacking stands 22 as desired.

Still referring to FIG. 1 of the drawings, it will be seen that there are a plurality of secondary link chain conveyors 24, each of which comprises a frame having sprockets 25 on its opposite ends over which the link chains 24 are trained. The sprockets 25 on the right ends of the secondary link chain conveyors 24 are on a common idler shaft 26. A main drive shaft 27 extends through the secondary stands 18 and the link chains of the secondary link chain conveyors 24 move over the sprockets 25 downwardly and around drive sprockets 28 of a predetermined size on the main drive shaft 27 and then upwardly and over sprockets not shown and then along the frame of the secondary link chain conveyor 24 to the left end sprockets 25 thereof. The sprockets 28 on the main drive shaft 27 are of a size that causes the secondary link chain conveyors 24 to move at a relatively slower rate than the movement rate of the link chain conveyors 13 hereinbefore described so that the work pieces W being delivered thereto will be slowed down and arranged in groups if necessary before being transferred to a plurality of third link chain conveyors 30, which extend from the secondary stands 18 longitudinally of the angle stacking and inverting device, to the right, as seen in FIGS. 1 and 1A. The link chains of the third link chain conveyors 30 are trained over sprockets 31 on the opposite ends of the third link chain conveyor 30, some of the sprockets 31 being arranged on the idler shaft 26 heretofore described. The links of the third link chain conveyors 30 move over idlers 32 adjacent the left ends of the third link chain conveyors 30 downwardly and around additional sprockets 29 of a desired size which are located on the main drive shaft 27. The different sized sprockets 29 as compared with the sprockets 28 heretofore referred to, enable the third link chain conveyors 30 to be driven at a slower speed than the second link chain conveyors 24.

Referring now to FIG. 1A of the drawings, it will be seen that the work pieces W will have moved from the left to the right on the third link chain conveyors 30 and it will be seen that the sprockets 31 over which the link chains of the third link chain conveyors 30 are trained, are located on a shaft 32A which is journaled in bearings on a frame 33 comprising a portion of a support stand 34. A fourth link chain conveyor 35 has sprockets 36 on its opposite ends with the sprockets 36 on the left end as seen in FIG. 1A being positioned on stub idler shafts 37 as best seen in FIG. 2 of the drawings, with the sprockets 36 on the right end of the fourth link chain conveyor 35 secured to a drive shaft 38 which is journaled on extension frame members 39 of the support stand 34, the link chains of the fourth link chain conveyor 35 being trained over the sprockets 36 downwardly and around the sprockets 40 and 41 respectively, at least one of which is driven by a drive mechanism 42 positioned on a secondary extension 43 of the support stand 34.

Still referring to FIG. 1A of the drawings, it will be seen that four vertically movable stops 44, 45, 46 and 47 and means for selectively moving the same into and out of obstructing relation with respect to the work pieces W are provided along with appropriate means for moving the stops 44, 45, 46 and 47 vertically as hereinafter described.

In FIG. 1A of the drawings, two work pieces W are shown in position against the stops 46 and it will be observed that a magnetic lifting head 48 is positioned between the stops 44 and 46 and between each of the plurality of fourth link chain conveyors 35 as best seen in FIG. 2 of the drawings.

Still referring to FIG. 1A, it will be observed that each of the magnetic lifting heads 48 is electromagnetic and thereby capable of being controlled so that they will either hold the work pieces W thereon or permit the same to move across their upper surfaces as hereinafter described.

Each of the magnetic lifting heads 48 is positioned on and supported and moved by an arm formed of two sections 49 and 50 respectively which are pivoted to one another by pivots 51 which are engaged inwardly of the ends of the sections 49 so that the sections 49 may be moved relative to the sections 50 by pneumatic piston and cylinder assemblies 52 which are pivoted between the ends of the sections 49 and brackets 53 formed on the sections 50. The arrangement of the sections 49 and 50 of the arms supporting the magnetic lifting heads 48 is illustrated in greater detail in FIGS. 3,4,5 and 6 of the drawings.

Still referring to FIG. 1A of the drawings, it will be seen that the sections 50 of the arms supporting the magnetic lifting heads 48 are secured to a lifting arm shaft 54 which extends through and is journaled in a plurality of arm support frames 55 on the support stands 34 of the device. Means for rotating the shaft 54 is provided and a switch means for energizing and de-energizing the lifting heads 48 is connected in a circuit to a source of electrical energy and wherein the switch means is responsive in operation to the predetermined position of the lifting heads 48 relative to the handling mechanism and the selected stations as hereinbefore described.

Still referring to FIG. 1A of the drawings, it will be seen that a vertically movable table 56 is positioned adjacent the right ends of the arm support frames 55, the upper surface 57 thereof comprising the selected position to which the angle stacking and inverting device of the invention delivers the work pieces W.

A plurality of vertically arranged guide members 58 are attached to the secondary extensions 43 of the support stands 34. Transverse openings are formed in the table 56 and a movable roller conveyor 59 having adjustable stops 60 and located on a base 61 is arranged for movement into and out of the openings in the table 56 so that the work pieces W thereon may be transferred to the conveyor 59. Actuation of the rollers of the conveyor 59 will then move the work pieces longitudinally thereof. The rollers of the conveyor 59 may be tilted toward the guide 60.

It will be observed that the work pieces W on the conveyor 59, which is formed of a plurality of horizontally spaced rolls, are arranged in alternately inverted relation and by referring now to FIGS. 3,4,5 and 6 of the drawings, the portions of the angle stacking and inverting device that engage the work pieces W and alternately pick them up and move them to the selected position or pick them up, invert them and move them to the selected position may be seen.

Figure 3:
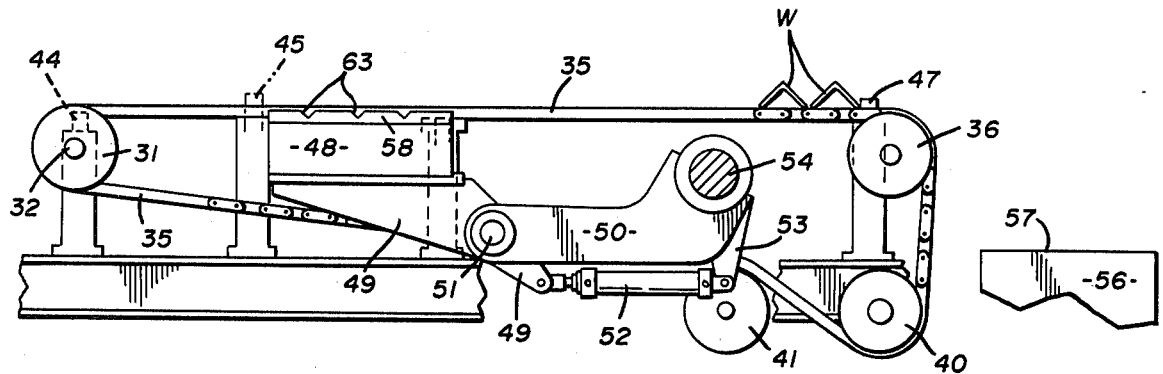
FIG. 3 is an enlarged detail of a portion of the device seen in FIG. 1A showing the lifting and inverting mechanism in a first position.
Figure 6:
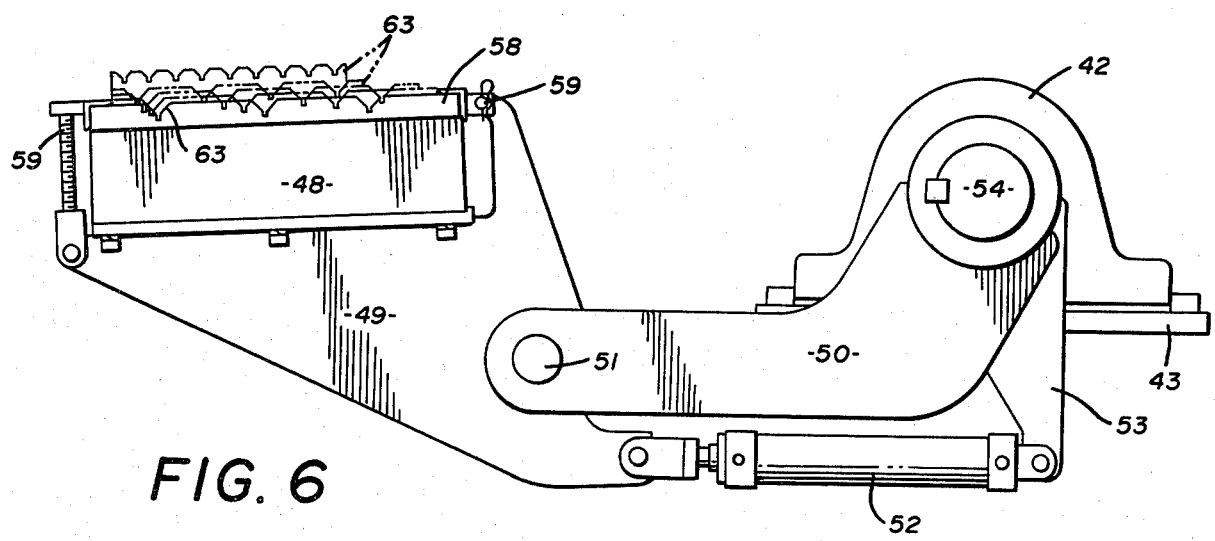
FIG. 6 of the drawings is an enlarged detail of the lifting and inverting mechanism of FIGS. 3,4, and 5 of the drawings with solid lines showing a replaceable work piece matching head and broken lines showing alternate configurations for an alternate number of work pieces.

By referring now to FIG. 3 of the drawings, it will be seen that the fourth link chain conveyor 35 has moved two elongated steel angles comprising the work pieces W to a position against the stop 47 which has been elevated to the position illustrated by a timing device not shown. The work pieces W moved across the upper surface of the magnetic lifting heads 48, the one illustrated in FIG. 3 of the drawings having three spaced V-shaped configurations 63 therein, it being understood that the upper portion of the magnetic lifting heads 48 can be varied by replacing an uppermost portion thereof as shown in FIG. 6 of the drawings and hereinafter described so that any desired number of work pieces may be picked up at one time.

Figure 4:
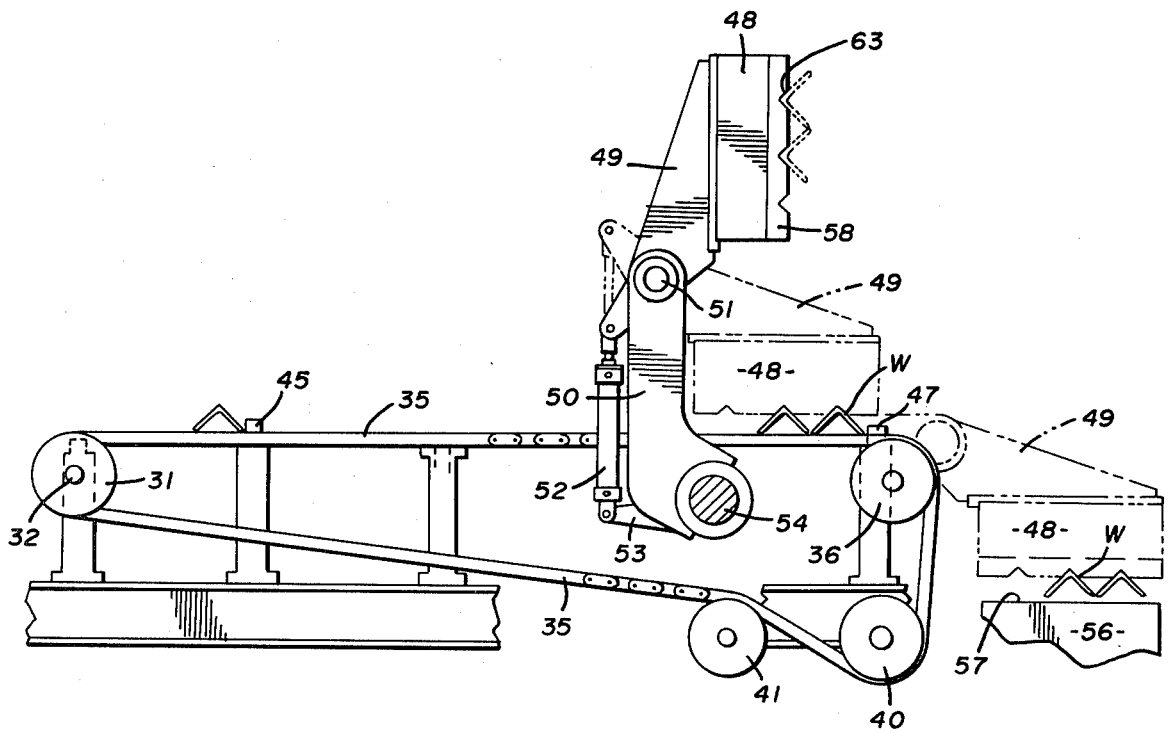
FIG. 4 is a side elevation of the device seen in FIG. 3 showing the lifting and inverting mechanism in a second position in solid lines and in subsequent third and fourth positions in broken lines.

The work pieces W as illustrated in FIG. 3 of the drawings, can be picked up and moved to the selected position comprising the upper surface 57 of the vertically movable table 56 by energization of the magnetic lifting heads 48, rotating the arm actuating shaft 54 to move the sections 49 and 50 of the arm from the position shown in FIG. 3 to the position shown in solid lines in FIG. 4 of the drawings.

In FIGS. 3 and 4 of the drawings, the sections 49 and 50 of the arm are in substantially end to end relation and by referring to FIG. 4 in particular, it will be obvious that it will be necessary to move the sections 49 to a right angular position with respect to the sections 50 in order that the magnetic lifting heads 48 can engage the work pieces W as shown in broken lines in FIG. 4.

The positioning of the arm sections 49 relative to the sections 50 is performed by energization of the piston and cylinder assemblies 52 under the control of the timing device hereinbefore referred to or alternately manually as desired. Actuation of the piston and cylinder assemblies 52 moves the sections 49 of the carrying arm and their magnetic lifting heads 48 whereupon the work pieces W are engaged by the magnetic lifting heads 48. The piston and cylinder assemblies 52 are again actuated to move the sections 49 back to substantially end to end relation with the sections 50 whereupon the shaft 54 is rotated from its upright position as seen in solid lines in FIG. 4 of the drawings, to the second position shown in broken lines to the right side of the device and thus positioning the magnetic lifting heads 48 and the work pieces W directly above the upper surface 57 of the table 56 whereupon the magnetic lifting heads 48 are de-energized and the work pieces positioned on the table 56.

Figure 5:
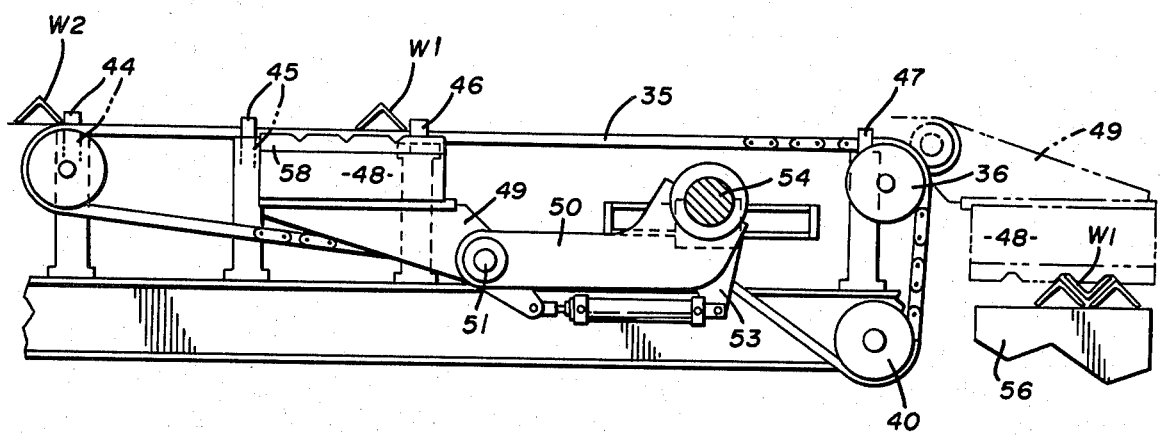
FIG. 5 is a side elevation of the mechanism of FIGS. 3 and 4 showing the lifting and inverting mechanism in solid lines in the first position beneath an angle shape to be picked up and inverted and in broken lines in a fifth position placing the inverted angle in the final selected position as desired.

By referring now to FIG. 5 of the drawings, it will be seen that a work piece W1 has been moved by the fourth link chain conveyors 35 to a position adjacent the elevated stops 46 and that another work piece W2 has been stopped by the elevation of the stops 44. The work piece W1 is positioned over the plurality of magnetic lifting heads 48 which is then magnetized by the timing device heretofore referred to, the lifting arm actuating shaft 54 partially rotated whereupon the sections 49 and 50 of the lifting arms and the magnetic lifting heads 48 thereon will swing in a half circle to the position shown in broken lines in FIG. 5 directly above the table 56 whereupon the magnetic lifting heads 48 are de-energized and the work piece W1 deposited in inverted relation on previously positioned work pieces W as seen in FIG. 4 of the drawings.

It will be obvious to those skilled in the art that any number of work pieces of different cross sectional configurations can be handled by the stacking and inverting device disclosed herein and that the work pieces may be stacked in as received condition as illustrated in FIGS. 3 and 4 of the drawings or inverted and positioned in a selected position as seen in FIG. 5 of the drawings or the handling alternated so that the work pieces are alternately positioned in as-received position and inverted position, as seen in FIG. 5 of the drawings.

By referring now to FIG. 6 of the drawings, it will be seen that the magnetic heads 48 are preferably provided with removable material engaging portions 58 which are detachably secured to the magnetic lifting heads 48 by fasteners 59. The material engaging portion 58 shown in solid lines in FIG. 6 has three semi-V-shaped configurations therein to selectively position and engage three of the work pieces W in as-received position where the angles thereof are upward. When desired the material engaging portion 58 may be removed and an alternate portion substituted which would have a greater number of modified V-shaped configurations 63 therein as shown in the four broken line representations which appear in superimposed relation in FIG. 6 of the drawings.

It will occur to those skilled in the art that when the work pieces being handled are not angular in cross sectional configuration, the material engaging portions 58 are changed so that the configurations therein correspond with the configuration of the work pieces to be engaged or alternately dispensed with so that the magnetic lifting heads 58 directly engage and pick up the work pieces without the guiding and positioning made possible by the configurations of the material engaging portions 58.

By referring again to FIG. 2 of the drawings, it will be seen that the work pieces move into the angle stacking and inverting device disclosed herein from the top of FIG. 2 moving on the rollers 11 of the shear run out conveyor 10. They are stopped by an end piece or guide, not shown, at the lower end of the shear run out conveyor 10 as seen in FIG. 2 of the drawings, whereupon the link chain conveyors 13 are actuated by being moved upwardly relative to the shear run out conveyor 10 and the work pieces moved sidewardly, to the right, as seen in FIG. 2 of the drawings and deposited on the second group of link chain conveyors 24, all as hereinbefore described. The rapid motion of the link chain conveyors 13 compared with the slower motion of the second link chain conveyors 24 groups the work pieces desirably and they are then passed on to the third link chain conveyors 30 and moved sidewardly, to the right as seen in FIG. 2 to the positions determined by the positioning of the stops 44, 45, 46 and 47 as hereinbefore described whereupon the magnetic lifting heads 48 are energized, lifted and positioned to move the work pieces in as received or inverted relation to the selected position comprising the upper surface 57 of the vertically movable table 56. The table 56 is movable vertically by means of a hydraulic piston and cylinder assembly 62 so that it can be initially positioned in the position shown in broken lines in FIG. 1A of the drawings and lowered successively as multiple layers of the work pieces W are deposited thereon and finally moved into registering level with the final conveyor 59 so that movement of the same can move the work pieces as stacked in the selected position onto the conveyor 59 where they can be secured in bundles of the desired number of work pieces by metal strapping as known in the art.

Figure 7:
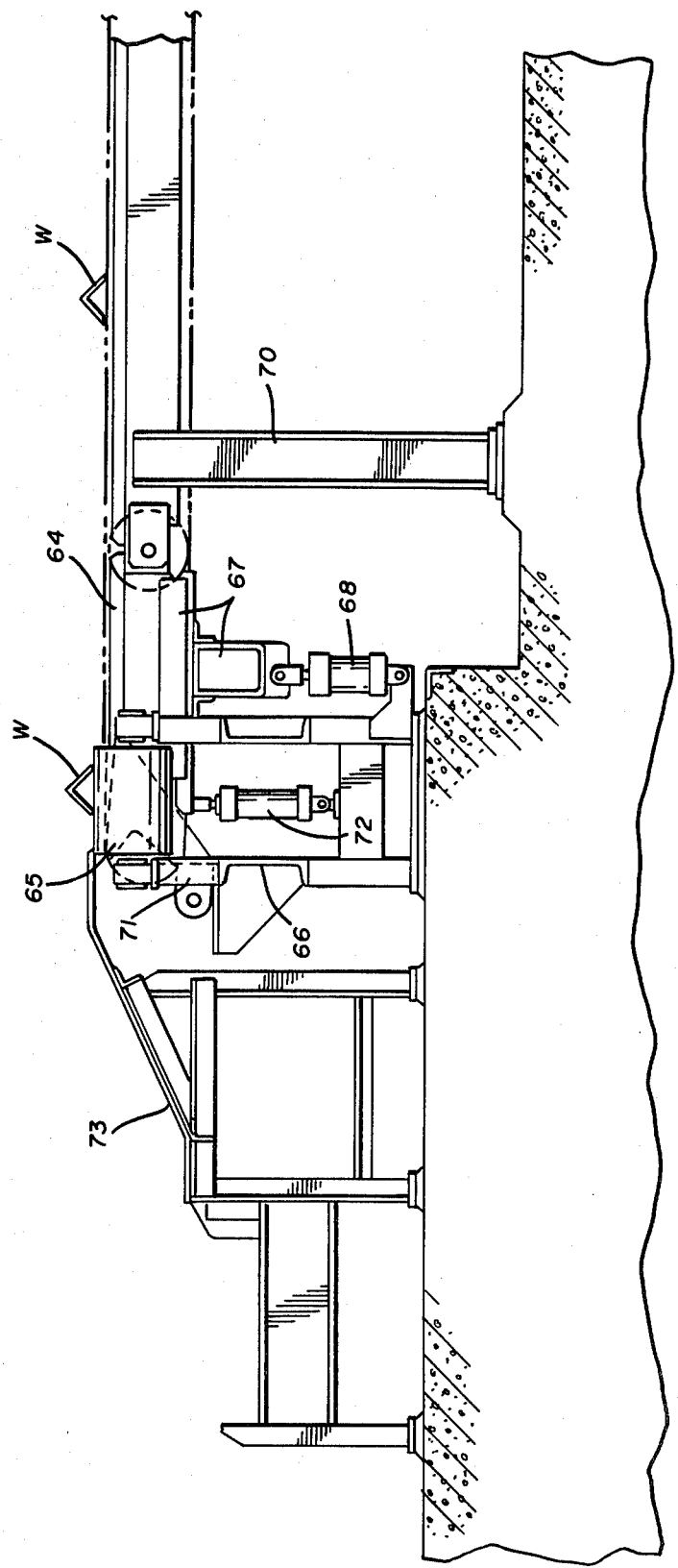
FIG. 7 is a side elevation of a modification of a portion of the stacking and inverting device.

By referring to FIG. 7 of the drawings, a modification will be seen in the means for moving the first link chain conveyors 64 vertically so as to pick up work pieces W from a shear run out conveyor including rollers 65 journaled in a table 66.

Several of the first link chain conveyors 64 are interconnected by a beam 67 and several piston and cylinder assemblies 68 are arranged to lift the beam 67. The right ends of the link chain conveyors 64 are pivoted on a pivot shaft 69 which is carried by frames 70.

The operation is the same as in the preferred embodiment hereinbefore described.

Still referring to FIG. 7, it will be seen that several kick out members 71 are pivoted to the table 66 and a plurality of secondary piston and cylinder assemblies 72 are arranged beneath the kick out member 71 to move the same upwardly in an arcuate path so as to lift and carry work pieces W, such as rejects, to the left to a table 73.

It will thus be seen that an angle stacking and inverting device has been disclosed which rapidly and efficiently receives metal shapes, such as angles, from a shear of a mill and moves them progressively sidewardly in groups which are formed by the different speeds of the several link chain conveyors to a plurality of specific locations in which they are either held or picked up and deposited in as received shape or picked up, inverted and deposited. The heretofore costly and time consuming operation of sorting, grouping, inverting, stacking and bundling elongated steel shapes is thus handled quickly and efficiently by the stacking and inverting device herein disclosed.

Although but one embodiment of the present invention has been illustrated and described, it will be apparent to those skilled in the art that various changes and modifications may be made therein without departing from the spirit of the invention and having thus described my invention what I claim is:

1. An improvement in a device that groups and stacks lengths of ferro-magnetic material, said device having a first conveyor with a plurality of spaced material engaging portions on which said lengths of material are positioned, stops at one end thereof, groups of link chain conveyors arranged with their adjacent ends in overlapping side by side relation, one of said chain link conveyors being movable vertically between a first position below the material engaging portion of said first conveyor to a second position above the surface of the material engaging portion of said first conveyor, and one of said chain link conveyors positioned transversely of said first conveyor between said spaced material engaging portion thereof for moving said lengths of material sidewardly from said first conveyor to selected stations, the improvement comprising a handling mechanism adjacent said stations arranged to magnetically pick up said material at said stations and deposit it in a predetermined position, said handling mechanism comprising a device selectively engagable with the upper and lower surfaces of said material and movable in an arcuate path between said selected stations and said predetermined position and means for moving said device and energizing and de-energizing the same.

2. The improvement in a device for grouping and stacking lengths of ferromagnetic material set forth in claim 1 and wherein said handling mechanism comprise a plurality of material engaging heads arranged to engage and hold said lengths of ferromagnetic material, arms consisting of first and second portions pivoted to one another and means on said second portions for moving said first portions from substantially end to end relation to right angular relation to said second portions, a shaft journaled in said handling mechanism transversely of said link chain conveyors, said second portions of said arms secured to said shaft and means for partially rotating said shaft to move said arms from a first position parallel with and below one of said groups of link chain conveyors to a second position above said group of link chain conveyors and to a third position beyond said group of link chain conveyors.

3. The improvement in a device for grouping and stacking links of ferro magnetic material set forth in claim 1 and wherein the device that is selectively engagable with the upper and lower surfaces of said material comprises an electromagnetic head and arms pivotally mounted in said handling mechanism carrying said electromagnetic head.

4. The improvement in a device for grouping and stacking lengths of ferromagnetic material set forth in claim 1 and wherein said means for moving said device and energizing and de-energizing the same comprises two part arms pivotally mounted in said handling mechanism carrying said magnetic heads, a shaft and means for imparting rotary motion to said shaft, said two part arms being secured to said shaft, a source of electrical energy for said electromagnetic heads and switch means in a circuit connecting said electromagnetic heads with said source and said means for imparting rotary motion to said shaft, said switch means response in operation to the predetermined position of said electromagnetic heads relative to said handling mechanism and said selected stations and said predetermined position.

* * * * *